Sept. 1, 1942.  J. C. KARNES  2,294,408
FIRE CONTROL TRAINING SYSTEM
Filed Jan. 25, 1941  3 Sheets-Sheet 1
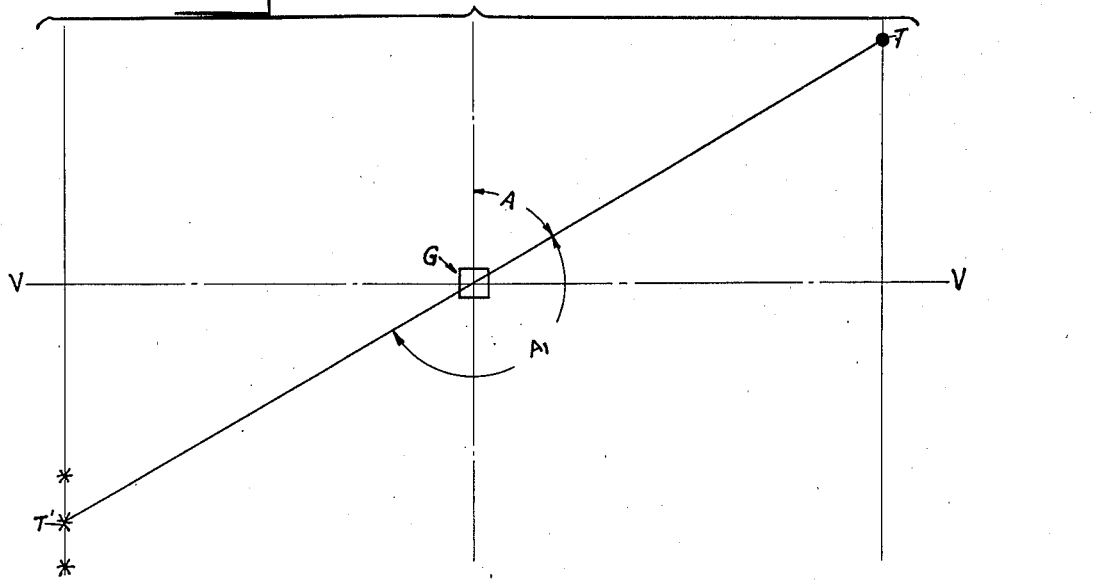
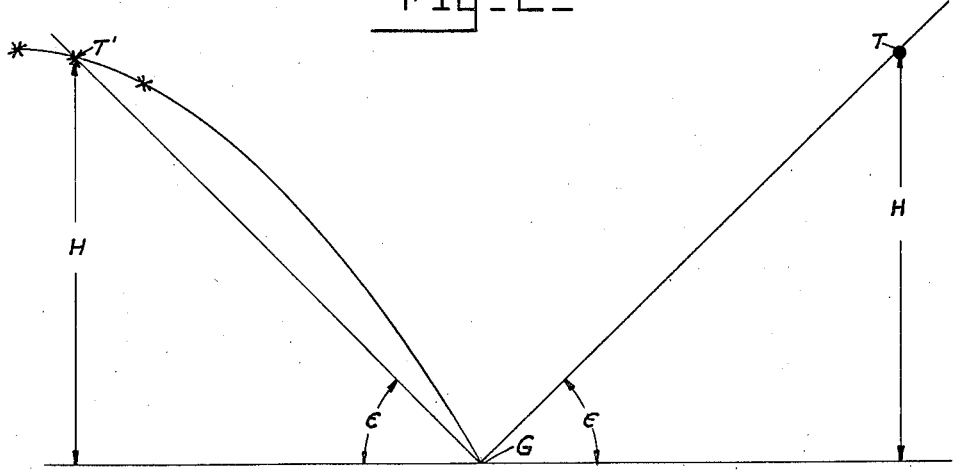
INVENTOR
James C. Karnes
BY
ATTORNEY Sept. 1, 1942.  J. C. KARNES  2,294,408
FIRE CONTROL TRAINING SYSTEM
Filed Jan. 25, 1941  3 Sheets-Sheet 2
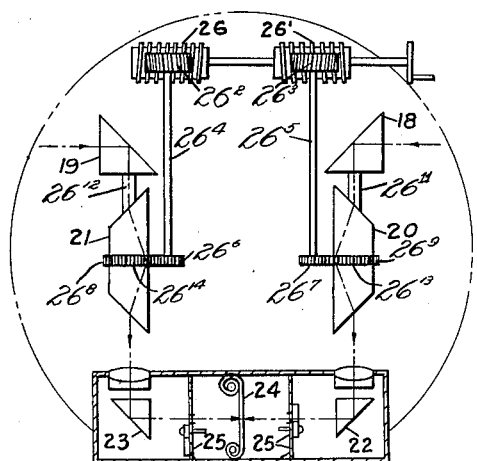
Fig_3_
Shutters operable in timed relation to advance of film 24 to expose alternate frames thereof to the same optical systems.
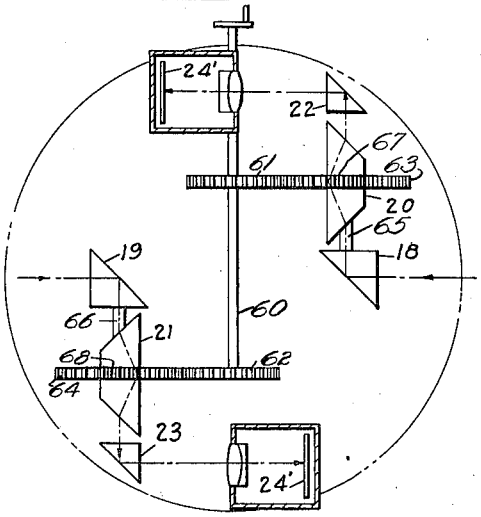
Fig_4_
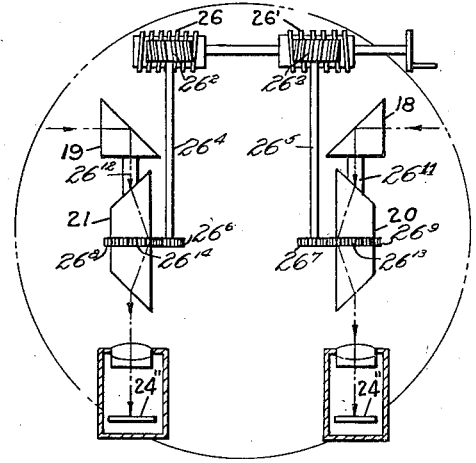
Fig_5_
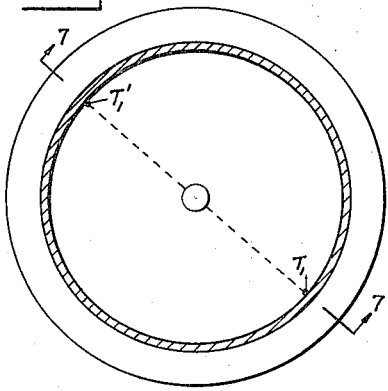
Fig_6_
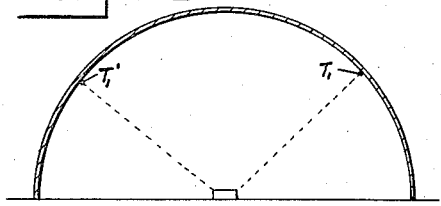
Fig_7_
INVENTOR
James C. Karnes
BY D. J. Kessenich & J. A. Church
ATTORNEY Sept. 1, 1942.  J. C. KARNES  2,294,408
FIRE CONTROL TRAINING SYSTEM
Filed Jan. 25, 1941  3 Sheets-Sheet 3

INVENTOR
James C. Karnes
BY
ATTORNEY

Patented Sept. 1, 1942

2,294,408

UNITED STATES PATENT OFFICE 2,294,408

FIRE CONTROL TRAINING SYSTEM

James C. Karnes, Buffalo, N. Y.

Application January 25, 1941, Serial No. 375,904

7 Claims. (Cl. 35—25)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a training system particularly adapted for use in training personnel to be or assigned to antiaircraft units.

It is an object of the invention to provide a system wherein the full advantages of firing at an aerial or similar target may be obtained without the disadvantage of requiring expensive radio controlled targets to fire upon or targets towed by aircraft.

It is a further object of the invention to utilize as the control point of a training system aircraft unencumbered by towing a target, and therefore, adapted to perform precisely as if under combat conditions.

A further object of the invention is to provide a system wherein a point in space is fired upon corresponding in altitude and angular height to a moving aerial object, but offset at a predetermined azimuth difference relative to the aerial object of greater angular distance than the bursting pattern of a shell whereby the system will be very efficient from the standpoint of safety and wherein it will never be necessary to cease firing as in the case of towed targets arises when the lead on the target approaches proximity to the towing aircraft to correct for windage, etc.

The specific nature of the invention as well as other objects and advantages thereof will clearly appear from a description of a preferred embodiment as shown in the accompanying drawings in which:

Fig. 1 is a horizontal projection of the line of position of the target T, and its corresponding position T' located at a predetermined azimuthal difference, as utilized in accordance with the system of this invention;

Fig. 2 is a vertical projection of the line of position of the target T, and its corresponding position T' located at a predetermined azimuthal difference upon a vertical plane whose trace is shown at V—V in Fig. 1;

Fig. 3 is a diagrammatic view of a camera used in recording the azimuthal position of the target and bursts with regard to a point corresponding to the target in azimuthal displaced relation;

Fig. 4 is a view similar to Fig. 3 showing a modified form of camera;

Fig. 5 is also a view similar to Fig. 3 showing another modified form of the camera;

Fig. 6 is a plan view of a class room suitable for the projection of the photographic recordings made by any of the cameras of Figs. 3 to 5;

Fig. 7 is a sectional view taken upon the line 7—7 of Fig. 6;

In accordance with the precepts of this invention, and as more clearly shown in Figs. 1 and 2 the target T, which may be an aircraft of any of the types that will be encountered in combat, is sent aloft and may pursue any course desired in relation to the battery position G in a manner precisely assimilated to combat conditions. Instead of firing directly at the target, however, the latter is merely tracked to establish a point T' in space corresponding in altitude H and angular height $\epsilon$ to the target T, displaced in azimuth at some predetermined angle $A_1$ from the azimuth A of the target T.

Conveniently the point T' will be displaced 180° in azimuth from the target T, although it is to be understood that any suitable predetermined azimuthal displacement of the point T' relative to target T may be selected. With the azimuthal displacement of point T' determined, which herein will be assumed as 180° as shown in Fig. 1 for the purpose of illustration, the azimuth receivers on the guns will be so oriented with respect to the director and tracking instruments of the fire control system as to effect displacement of the guns 180° in azimuth from the target T when the guns are laid in the output azimuth of the fire control system in tracking target T to thereby direct the guns on point T' in azimuth. The other firing data such as fuse range and quadrant angle of elevation of point T' will be the same as for target T, and will, therefore, be the normally computed output firing data of the fire control system in tracking target T corrected for such factors as that of wind etc., which will normally be the reverse in sign to corrections for the same factors applied to data directing the guns to point T.

Figure 8:
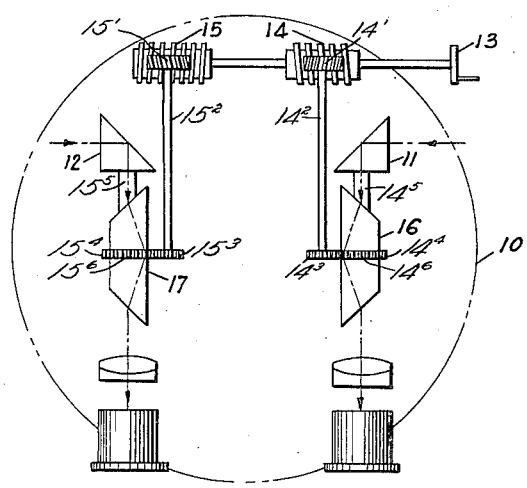
Fig. 8 is a diagrammatic spotting instrument for use with the system of this invention.
Figure 9:
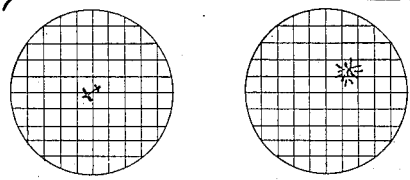
Fig. 9 is a view through the image plane of the instrument shown in Fig. 8.

To determine deflection spotting corrections from the imaginary point T' in space corresponding in altitude and angular height to target T, for the purpose of adjusting fire on point T' a spotting instrument generally shown in Fig. 8 is provided. This instrument is supported upon a suitable base 10 adapted to be demountably attached to a tripod or other supporting standard for rotation in azimuth and is a binocular telescope comprised of two right angle telescopes. As clearly shown in the diagrammatic view of Fig. 8 the telescopic system includes a pair of right angle reflecting prisms 11 and 12 mounted to reflect incident rays 180° apart into the system of each telescope and are rotatable about the optical axes of their respective telescopes in equal and opposite angular relation by the handwheel 13 which drives the right and left hand worms 14 and 15, respectively, meshing with cooperating worm wheels 14' and 15' attached to shafts $14^2$ and $15^2$ which drive gears ($14^3$—$14^4$), ($15^3$—$15^4$) and shafts $14^5$, $15^5$ to rotate the prisms 11 and 12. After reflection from the objective prisms 11, 12 the rays enter the rotating erecting prisms 16 and 17 which are driven at half the angular velocity of the objective prisms by a suitable mechanical interconnection therewith, such as gear teeth $14^6$, $15^6$ on the prism mountings intermeshing with the gears $14^4$, $15^5$, respectively, and continue through the telescopes including the reticules, field lens and eye lens as will be clearly understood. In this instrument each telescope has a reticule, the design of which is generally indicated in Fig. 9. By properly directing one of the objective prisms upon target T the other prism will automatically be trained upon point T' and the relative relation of a point on target T may be correlated to the point T' by the grid lines upon the reticles. Deflections of bursts seen through the telescope imaging the bursts may be read directly from the grid therein. There may, in case of prolonged observation, be a tendency for the observer to fuse the image fields of the two telescopes but this may be avoided by merely blinking the eyes or inserting shutters in the telescopic system to alternately expose the image fields of the two telescopes.

Range corrections may be controlled on point T' by the usual self-contained base or single station range finder taken in conjunction with the range of target T, or if preferred by the two station system used in the same manner, by ascertaining the range or altitude difference between the bursts and target T.

A photographic recordation of a firing practice in accord with the present system suitable for subsequent projection for study and critique is within the contemplation of this invention. To this end a camera such as the one disclosed in Fig. 3 may be used. This camera comprises a duplicate optical system with right angle reflecting prisms 18, 19, rotating erecting prisms 20, 21, and right angle reflecting prisms 22, 23 for reflecting the images of the two systems upon a suitable photographic film 24. The prisms 18 and 19 are angularly movable in equal and opposite directions by the right and left hand worms 26 and 26', worm wheels $26^2$, $26^3$, shafts $26^4$, $26^5$, gears ($26^6$—$26^8$), ($26^7$—$26^9$) and shafts $26^{11}$, $26^{12}$, respectively, to rotate the prisms about the optical axes of their respective telescopes. The worms 26 and 26' are also operably connected with the rotating prisms 20 and 21, respectively, to drive them at half the angular velocity of prisms 18, 19 by means of teeth $26^{13}$, $26^{14}$ on the prism mountings disposed in intermeshing relation with the gears $26^9$ and $26^8$. As will be understood the film 24 may be of the continuous type and have the images of the two systems of the camera superimposed thereupon, or if preferred shutters 25 may be provided to be operated in timed relation to the advance of film 24 for exposing one frame of the film to the optical system imaging the target and the successive frame to the optical system imaging the bursts. Moreover, if preferred the use of separate films for each optical system may be provided for.

A modified form of camera suitable for use with this system is shown in Fig. 4, and still another in Fig. 5. Parts corresponding to similar parts in Fig. 3 are identified by the same reference characters. These two forms of the invention differ from the form of Fig. 3 mainly in the organization of the parts and in the fact that separate films indicated at 24' and 24'', respectively, are provided for each of the optical systems thereof.

In Fig. 4 the shaft 60 has spur gears 61 and 62 affixed thereon and disposed in driving relation to gears 63 and 64 which rotate the objective prisms 18, 19 through shafts 65 and 66 suitably connected to the prisms in driving relation, respectively. The prisms 20, 21 have gear teeth 67, 68 in their mountings intermeshed with the gears 63 and 64, respectively, whereby these latter prisms will be driven at half the angular speed of the prisms 18 and 19 when shaft 60 is rotated. The gear train for driving the prisms in the camera shown in Fig. 5 is similar in all respects to the gear train shown in Fig. 3 and corresponding elements thereof are correspondingly identified.

In all forms the camera is mounted to be rotatable in azimuth so that one optical system may be trained on target T and the other one on point T'.

Range differences between target T and point T' may be recorded by means of stereocameras located at the position of the firing battery G or by any other suitable method.

A studio class room of semi-spherical interior form as illustrated in Figs. 6 and 7 is used and the photographic recordations of any past firing practice may be projected upon the interior surface thereof by using a projection machine of the same form as the cameras shown in Figs. 4 or 5 producing an image of the target T at $T_1$ and bursts at or adjacent point T' at $T_1'$. A student may take an instrument similar to the spotting instrument shown in Fig. 8 and view the images $T_1'$, $T_1$ therethrough obtaining the same view as was obtained in the field during firing through the use of the spotting instrument shown in Figs. 8 and 9. The student may determine visually by this method the correction necessary to place the burst upon point T', which in effect is the target, and the instructor will be enabled to check the accuracy of the student in making fire control corrections from such observation. This procedure will give an exact visual illustration of the problem as to azimuth correction.

The stereo pictures made of the target T and area in the vicinity of point T' showing the busts may be produced upon the screen as an ordinary stereo-relief moving picture or viewed in a stereo-comparator for the purpose of determining the range differences in the target and bursts and to give the student training in depth perception of binocular vision.

In reproducing both the azimuth and range control photographs, suitable conventional means may be used to determine the azimuth or horizontal deflection and range or elevation differences for the purpose of recordation and such recordings used for making an analytical study of the firing practice as a whole, that is, in conjunction with the firing battery's record of practice in order to determine material and personnel errors.

By this system a single firing practice as recorded may be utilized for training purposes to the same extent as actually firing the battery insofar as training in fire adjustment is concerned, thus effecting a great economy in ammunition, and providing for effective training of those being trained in fire control by the use of firing data recorded as a result of a single previous firing.

Having now described the invention in its present preferred form I claim:

1. In a fire control training system, the steps of moving a target through space, directing a gun at a point in space corresponding in altitude and angular height to said target and at a predetermined azimuthal difference relative thereto of greater angular distance than the bursting pattern of a shell, firing one or more shells set to explode upon reaching said point from said gun, and continuously recording photographically the target and bursts in the vicinity of said point; whereby said moving target may be utilized as a fire control point without the necessity of destroying the target.

2. In a fire control training system, the steps of moving a target through space, directing a gun at a point in space corresponding in altitude and angular height to said target and at a predetermined azimuthal difference relative thereto of greater angular distance than the bursting pattern of a shell, firing one or more shells set to explode upon reaching said point from said gun, continuously recording photographically the target and bursts in the vicinity of said point, projecting the photographic recordations upon a projection surface which is spherical about the point of projection, and measuring the deflection of said bursts relative to the target from said projected recordations; whereby said moving target may be utilized as a fire control point for training purposes without the necessity of destroying the target.

3. In a fire control training system, the steps of moving a target through space, directing a gun at a point in space corresponding in altitude and angular height to said target and at a predetermined azimuthal difference relative thereto of greater angular distance than the bursting pattern of a shell, firing one or more shells set to explode upon reaching said point from said gun, adjusting fire in azimuth by measuring the azimuthal deviations from the point, and continuously recording photographically the targets and bursts in the vicinity of said point; whereby said moving target may be utilized as a fire control point for training purposes without the necessity of destroying the target.

4. In a fire control training system, the steps of moving a target through space, directing a gun at a point in space corresponding in altitude and angular height to said target and at a predetermined azimuthal difference relative thereto of greater angular distance than the bursting pattern of a shell, firing one or more shells set to explode upon reaching said point from said gun, and adjusting fire in range by making stereo comparisons of the target and bursts; whereby said moving target may be utilized as a fire control point for training purposes without the necessity of destroying the target.

5. In a fire control training system the steps of moving a target through space, directing a gun at a point in space corresponding in altitude and angular height to said target and at a predeterminer azimuthal difference relative thereto of greater angular distance than the bursting pattern of a shell, firing one or more shells set to explode upon reaching said point from said gun, and adjusting fire in range by measuring the range of the target by a range finding device, and transmitting this range to the operator of a second range finding device for measuring the range of the bursts whereby the operator of the second range finding device may determine the range differences in the target and bursts; whereby said moving target may be utilized as a fire control point for training purposes without the necessity of destroying the target.

6. In a fire control training system the steps of moving a target through space, directing a gun at a point in space corresponding in altitude and angular height to said target and at a predetermined azimuthal difference relative thereto of greater angular distance than the bursting pattern of a shell, firing one or more shells set to explode upon reaching said point from said gun, and continuously recording by stereo-photographic means the target and bursts in the vicinity of said point; whereby said moving target may be utilized as a fire control point for training purposes without the necessity of destroying the target.

7. In a fire control training system the steps of moving a target through space, directing a gun at a point in space corresponding in altitude and angular height to said target and at a predetermined azimuthal difference relative thereto, firing shells set to explode upon reaching said point from said gun, continuously recording stereo-photographically the target and bursts in the vicinity of said point, and measuring the range differences of said target and bursts by making a stereo comparison of the recordations of the target and bursts.

JAMES C. KARNES.